US010442306B2

(12) United States Patent
Sufrin-Disler et al.

(10) Patent No.: US 10,442,306 B2
(45) Date of Patent: Oct. 15, 2019

(54) VEHICLE POWER MANAGEMENT

(71) Applicant: Faraday & Future Inc., Gardena, CA (US)

(72) Inventors: Daniel Arnold Sufrin-Disler, Toronto (CA); Phillip John Weicker, Pasadena, CA (US); Anil Paryani, Cerritos, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 75 days.

(21) Appl. No.: 15/132,733

(22) Filed: Apr. 19, 2016

(65) Prior Publication Data
US 2017/0297448 A1 Oct. 19, 2017

(51) Int. Cl.
*H02J 7/00* (2006.01)
*B60L 11/18* (2006.01)
*B60L 1/00* (2006.01)
*B60L 58/12* (2019.01)
*B60L 58/20* (2019.01)

(52) U.S. Cl.
CPC ............ *B60L 11/1861* (2013.01); *B60L 1/00* (2013.01); *B60L 58/12* (2019.02); *B60L 58/20* (2019.02); *B60L 2240/549* (2013.01); *Y02T 10/7005* (2013.01); *Y02T 10/7044* (2013.01); *Y02T 10/7066* (2013.01)

(58) Field of Classification Search
USPC ......................................................... 320/104
See application file for complete search history.

(56) References Cited

U.S. PATENT DOCUMENTS

| 8,258,793 | B2* | 9/2012 | Frisch | G01R 19/16542 |
| | | | | 324/433 |
| 2004/0264091 | A1* | 12/2004 | Ishida | H02J 7/0031 |
| | | | | 361/93.1 |
| 2005/0286189 | A1* | 12/2005 | Rhodes | H02J 3/00 |
| | | | | 361/62 |
| 2006/0197498 | A1* | 9/2006 | Bucur | H01M 2/1016 |
| | | | | 320/114 |
| 2007/0090801 | A1* | 4/2007 | Kim | G01R 31/362 |
| | | | | 320/128 |
| 2008/0197821 | A1* | 8/2008 | Hasegawa | H02M 1/36 |
| | | | | 323/238 |

(Continued)

FOREIGN PATENT DOCUMENTS

| CN | 1574535 A | 2/2005 |
| CN | 101247078 A | 8/2008 |

(Continued)

*Primary Examiner* — Samuel Berhanu
(74) *Attorney, Agent, or Firm* — Knobbe Martens Olson & Bear LLP

(57) ABSTRACT

A battery level management system for an electric vehicle during a powered down and uncharged period is disclosed. A current output from a low voltage battery of the electric vehicle being above a threshold can be sensed to wake up a control unit associated with the low voltage battery without waking up or fully powering other control units. Upon waking up, the control unit associated with the low voltage battery can start monitoring the current output from the low voltage battery and controlling the power drawn from the low voltage battery by enabling or disabling other control units to manage the remaining low voltage battery power level.

15 Claims, 5 Drawing Sheets

(56) References Cited

U.S. PATENT DOCUMENTS

2010/0213887 A1* 8/2010 Louch .................... H02J 7/35
                                                  320/101
2013/0187590 A1* 7/2013 Ferrel ................. H02J 7/1423
                                                  320/104
2013/0271062 A1* 10/2013 Lu ........................ H02J 7/35
                                                  320/101

FOREIGN PATENT DOCUMENTS

CN        100549704 A     10/2009
CN        103213510 A     7/2013

* cited by examiner

VEHICLE POWER MANAGEMENT

BACKGROUND

Field

The described technology generally relates to automobiles, more specifically, to electric vehicle power management.

Description of the Related Art

Power management of an electric vehicle can be challenging as the task requires balancing efficiency, functionality, and efficacy. Even when the main driving system of the electric vehicle is powered down, some parts of the electric vehicle may stay active or intermittently become active, continuing to draw power from one or more batteries of the electric vehicle. Accurate measurement, monitoring, and managing of the power level of the batteries without consuming too much power when the main drive system is powered off can be challenging.

SUMMARY

The methods and devices of the described technology each have several aspects, no single one of which is solely responsible for its desirable attributes.

In one embodiment, an electric vehicle includes a first battery, a second battery, a vehicle drive system powered by the first battery, one or more secondary systems powered by the second battery, each of the one or more secondary systems comprising a system control unit, a battery control unit for the second battery, and a battery output current sensing circuit coupled to the second battery and the battery control unit, wherein the battery control unit wakes up and initiates monitoring of the second battery in response to the battery output current sensing circuit sensing a current level above a threshold.

In another embodiment, a method for managing a battery level of an electric vehicle while powered down includes sensing a current from a battery being above a threshold, waking up a battery control unit coupled to the battery based on the sensed above-threshold current from the battery, determining a current output of the battery with the battery control unit upon waking up, and controlling operation of a second control unit based on the determined current output of the battery, wherein the second control unit is associated with a secondary vehicle system, and wherein the secondary vehicle system is powered by the battery.

In another embodiment, an electric vehicle low voltage battery monitoring system includes means for sensing a current from a battery being above a threshold, means for waking up a battery control unit coupled to the battery based on the sensed above-threshold current from the battery, means for determining a current output of the battery with the battery control unit upon waking up, controlling operation of a second control unit based on the determined current output of the battery, wherein the second control unit is associated with a secondary vehicle system, and wherein the secondary vehicle system is powered by the battery.

BRIEF DESCRIPTION OF THE DRAWINGS

These drawings and the associated description herein are provided to illustrate specific embodiments of the invention and are not intended to be limiting.

DETAILED DESCRIPTION

Figure 1:
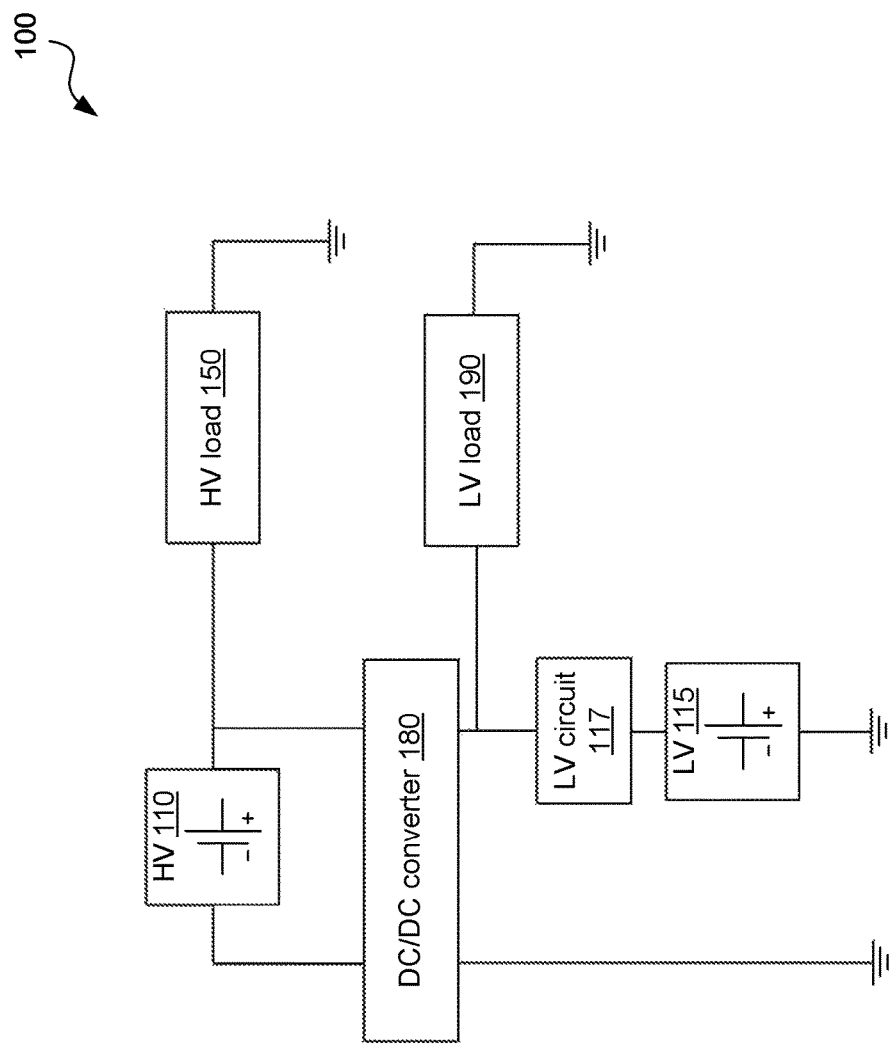
FIG. 1 is a block diagram of an electric vehicle powering system according to one embodiment.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to automotive systems and/or different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A battery level management system for an electric vehicle during a powered down and uncharged period is disclosed. A current output from a low voltage battery of the electric vehicle being above a threshold can be sensed to wake up a control unit associated with the low voltage battery without waking up or fully powering other control units. Upon waking up, the control unit associated with the low voltage battery can start monitoring the current output from the low voltage battery and controlling the power drawn from the low voltage battery by enabling or disabling other control units to manage the remaining low voltage battery power level.

FIG. 1 is a block diagram of a direct current (DC) powering system. The illustrated DC powering system 100 includes a high voltage (HV) battery 110 providing power to a high voltage load 150, a low voltage (LV) battery 115 providing power to a low voltage load 190, and a DC/DC converter 180 converting a high DC voltage of the high voltage battery 110 to a lower DC voltage to allow the high voltage battery 110 to charge the low voltage battery 115. The illustrated powering system 100 also includes a low voltage battery circuit 117 coupled to the low voltage battery 115 to manage the power level of the low voltage battery 115 as further discussed below in connection with FIGS. 2-3. The illustrated powering system 100 can, for example, be implemented in an electric vehicle with the high voltage load 150 being a load typically requiring high voltage, such as a vehicle drive system, and the low voltage load 190 being a load typically requiring low voltage, such as a vehicle entertainment system. As further described below in connection with FIGS. 2-3, the low voltage load 190 can be implemented in a distributed manner, and the low voltage load 190 can include multiple systems or subsystems. Although the batteries 110, 115 each are illustrated as a single element in FIGS. 1-4, the batteries 110, 115 depicted in FIGS. 1-4 are only representational, and the batteries 110, 115 may be implemented with units or subunits such as packs, strings, modules, cells, etc.

The terms "high" voltage and "low" voltage used herein generally denotes the relative levels of voltages provided to the loads powered by the batteries disclosed herein, and the terms "high" and "low" are not limited to any absolute levels of voltages. As generally described herein, a load operating with a "high" voltage and a load operating a "low" voltage can indicate that the voltage differential between the "high" and "low" voltages can be significant enough that a direct coupling or shorting of the "high" voltage and the "low" voltage of the loads would cause the loads to malfunction due to a significant current surge. When the disclosed herein is implemented in an electric vehicle, the "high" voltage load can be provided with voltages in the order of hundreds of volts, e.g., about 400 V, while the "low" voltage load can be provided with voltages in the order of a few tens of volts at most, e.g., less than 20 V.

Figure 2:
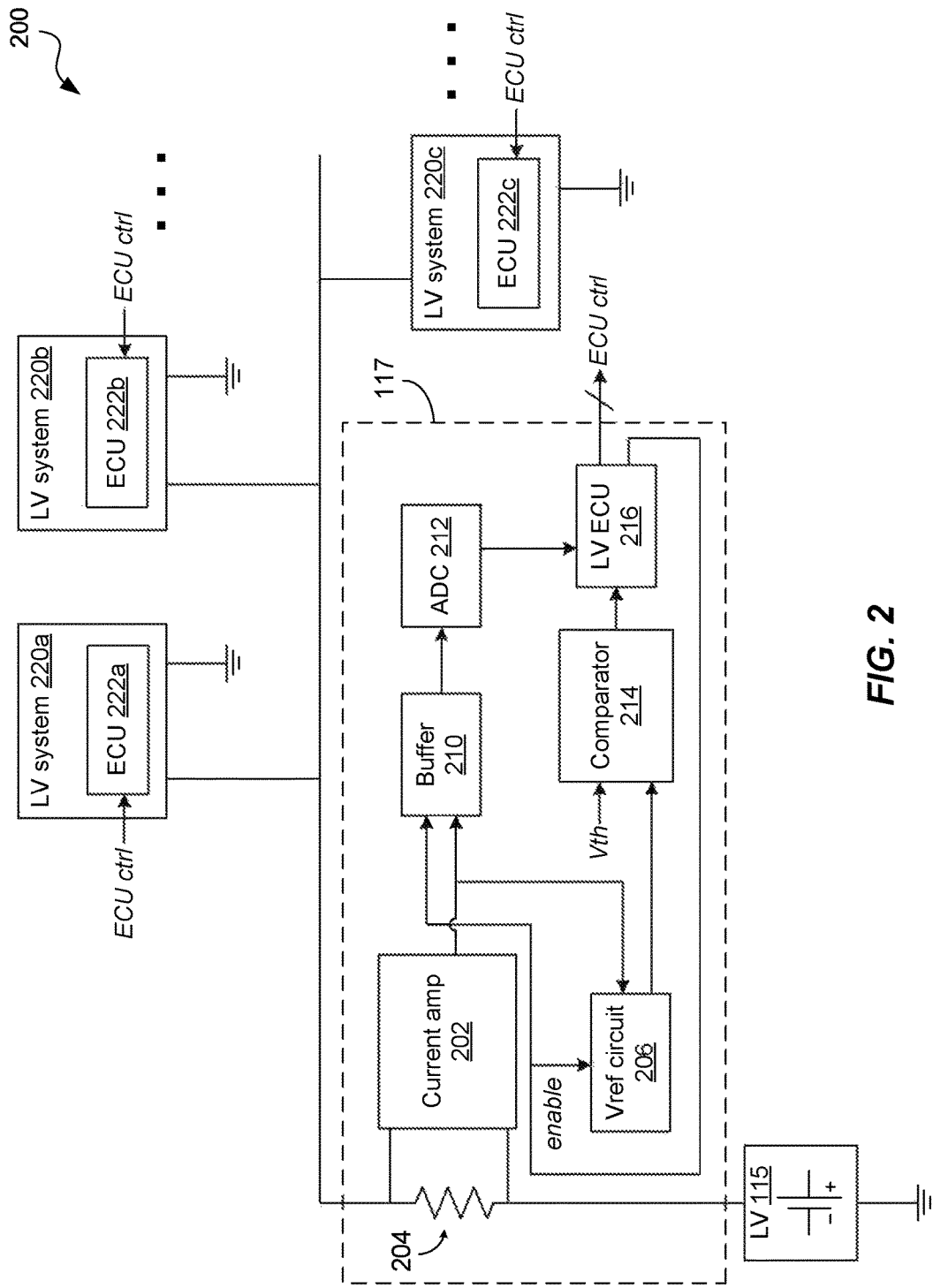
FIG. 2 is a block diagram of an example battery power management system according to one embodiment.

FIG. 2 is a block diagram of an example battery power management system according to one embodiment. The illustrated system 200 includes the low voltage battery 115 powering a low voltage load, which includes low voltage systems 220a, 220b, 220c, . . . , individually or collectively referred to herein as the low voltage system(s) or secondary system(s) 220. The secondary systems 220a, 220b, 220c, . . . , include respective system electronic control units (ECUs) 222a, 222b, 222c, . . . , individually or collectively referred to herein as the system ECU(s) or system control unit(s) 222. In embodiments implemented in an electric vehicle, the secondary system 220 with their respective system control units 222 can be understood as a decentralized or distributed network within the electric vehicle responsible for various functions requiring a low voltage power from the low voltage battery 115. In some embodiments, the system control units 222 can be implemented with processors or microcontrollers responsible for controlling their respective secondary systems 220. The low voltage battery 115 is coupled to the low voltage battery circuit 117, which includes a shunt resistor 204, a current amplifier 202, a voltage reference circuit 206, a comparator 214, a buffer 210, an analog-to-digital converter (ADC) 212, and a LV battery ECU or battery control unit 216. It is to be noted that the illustrate embodiment in FIG. 2 is only one example embodiment, and in other embodiments, the circuit 117 may include additional passive and/or active circuit elements, such as filters, isolation capacitors, buffers, amplifiers, signal processing elements, etc.

In some embodiments, the current amplifier 202, the voltage reference circuit 206, and the comparator 214 can form a battery output current sensing circuit configured to sense a current output from the low voltage battery 115 being above a certain level. The current amplifier 202 can be coupled to the shunt resistor 204 and be configured to measure a voltage across the shunt resistor 204 to generate an output. Although the battery output current sensing circuit illustrated in FIGS. 2-3 includes the current amplifier 202 measuring current across the shunt resistor 204, it is to be noted that in other embodiments, measuring the current from the LV battery 115 can be implemented otherwise. For example, in some embodiments, current sensors, such as Hall-effect sensor(s) or magnetoresistive sensor(s), can be used to measure the current from the LV battery 115 instead of or in addition to using the shunt resistor 204. The output from the current amplifier can be indicative of the level of the current drawn from the low voltage battery 115. In some embodiments, the voltage reference circuit 206 can include passive circuit elements, such as resistors and/or capacitors. Also in some embodiments, the voltage reference circuit 206, even when not enabled, can provide an input to the comparator 214 based on the input from the current amplifier 202. Further details of the voltage reference circuit 206 and the comparator 214 are discussed below in connection with FIG. 3. The comparator 214 can be configured to compare the input from the voltage reference circuit 206 and a threshold voltage, Vth, to generate an input signal to the battery control unit 216.

In some implementations, the input signal to the battery control unit 216 from the comparator 214 can be understood as a wake-up signal. For example, when an electric vehicle, which includes the illustrated system 200, is powered off (i.e., the main driving load is powered off), at least parts of the voltage reference circuit 206 can be disabled, which can make the voltage reference circuit 206 to output a zero voltage to the comparator 214 initially. The voltage reference circuit 206 may include one or more passive circuit elements, which can allow generating a non-zero voltage output to the comparator 214 upon receiving a non-zero input from the current amplifier 202. In some embodiments, the current amplifier 202 can be configured to generate a current output to the voltage reference circuit 206 based on a voltage across the shunt resistor 204, where the voltage across the shunt resistor 204 indicates the level of currant drawn from the low voltage battery 115. The voltage reference circuit 206, when receiving a current input from the current amplifier 202, may provide a voltage input to the comparator 214 so that a wake-up signal can be generated when the battery output current sensing circuit (e.g., the current amplifier 202, the voltage reference circuit 206, and the comparator 214) senses that a current drawn from the low voltage battery 115 is above a certain threshold level. Although the various components of the current sensing circuit are described as generating and/or receiving particular current or voltage inputs or outputs, specific implementations as to what types (e.g., current or voltage) of inputs and/or outputs are used may differ from the examples described here.

When the voltage level indicative of the current drawn from the low voltage battery 115 exceeds the threshold voltage, Vth, the comparator 214 signals to the battery control unit 216 to wake up through the wake-up signal. The battery control unit 216 can generate an enable signal, enable, upon receiving the wake-up signal from the comparator 214. The enable signal, enable, enables at least one or more elements of the voltage reference circuit 206 and the buffer 210, which can be used to buffer and forward the voltage input from the current amplifier 202 indicative of the current drawn from the low voltage battery 115 to the ADC 212. The ADC 212 can receive an analog input indicative of the low voltage battery current output from the buffer 210 and send a digital output indicative of the low voltage battery current output to the battery control unit 216. In some embodiments, the battery control unit 216 can be implemented using a microprocessor. The battery control unit 216 can receive the ADC output and determine the level of current output from the low voltage battery 115. Based on this determined current output level of the low voltage battery 115, the battery control unit may output one or more control signals, ECU ctrl, to the system control units 222 of the secondary systems 220. The control signal(s), ECU ctrl, can enable or disable one or more of the secondary systems 220 in part or in whole.

In some instances, even when the main driving system is turned off, one or more of the low voltage or secondary systems 220 may still need to stay on or be turned on and off time to time, drawing power from the low voltage battery 115 to perform non-drive or stationary functions, such as self-calibration or periodic running of a pump for chassis control or telematics. It can be advantageous to implement a system that monitors and manages the power level of the low voltage battery 115 as the non-drive power can be occasionally consumed by the secondary systems 220 of the electric vehicle so that the power level of the low voltage battery 115 would not be depleted over a prolonged period of non-driving, stationary, yet non-charging or unplugged time, for example. In some embodiments, a minimum level of power consumption can be maintained to keep the battery output current sensing circuit (e.g., at least parts of 202, 206, and 214 in FIG. 2, or at least parts of 202, 312, 314, 306, and 304 in FIG. 3) be responsive to the current output from the low voltage battery 115. It can be advantageous to implement a system disclosed herein to allow the battery control unit 216 to wake up first when the current above a certain level is drawn from the low voltage battery 115 so that the battery control unit 216 can monitor and assess whether and to what extent the low voltage battery power consumption should be allocated throughout the distributed secondary system without enabling and powering all the system control units 222 to assess and monitor the low voltage power consumption. In some embodiments, additional battery management strategies, such as load shedding, can also be implemented in conjunction with the disclosed herein.

Furthermore, the battery control unit 216 can execute one or more algorithms or instructions to manage low voltage power usage by the system control units 222 based on various priorities or preferences of non-driving or stationary functions or operations. The system control units 222 and the battery control unit 216 can also be in communication with other controllers, such as one or more controllers responsible for managing the high voltage battery 110, to gather additional information or status of the electric vehicle and/or the high voltage battery 110. For example, in some instances, before the electric vehicle shuts down, the system control units 222 may receive a message regarding whether their respective secondary systems 220 can draw current from the low voltage battery 115. Depending on the remaining power level of the low voltage battery 115 at the time of shutting down, the disclosed herein can be strategically employed. For example, if the low voltage battery 115 is at near full or at least acceptable capacity, the battery control unit 216 can instruct the system control units 222 to allow drawing current from the low voltage battery 115. In another example, when the remaining power level of the low voltage battery 115 cannot provide indiscriminately provide power to the secondary systems 220, the battery control unit 216 can send messages to some or all of the secondary control units 222 not to draw power from the low voltage battery 115. In some embodiments, the determination of whether to control or limit power provision to the secondary systems 220 can always be performed as the battery control unit 216 can be woken up first to make the determination. In other embodiments, the determination can be selectively performed depending on particular conditions, such as remaining power levels of the low voltage battery 115.

Figure 3:
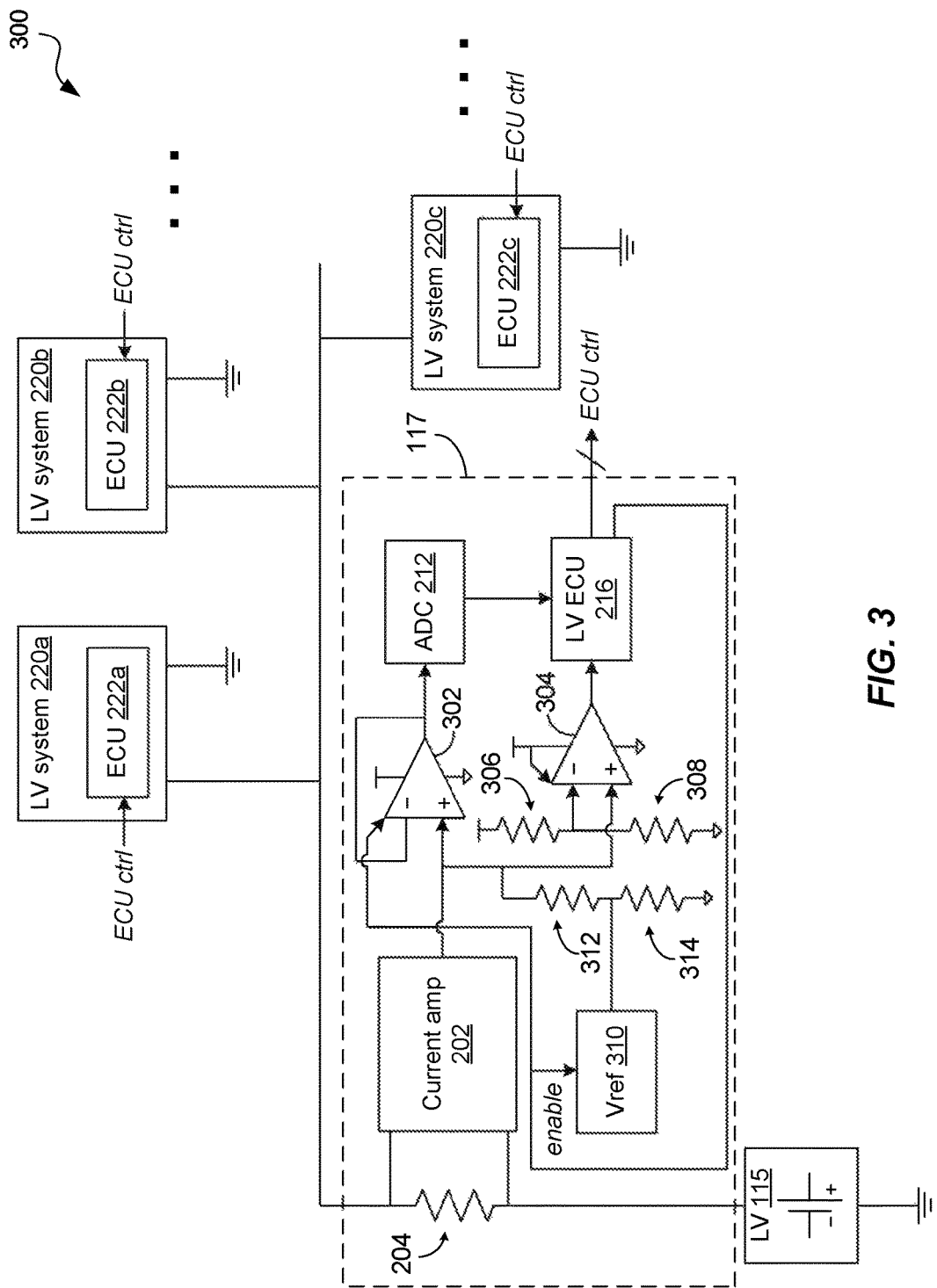
FIG. 3 is a block diagram of another example battery power management system according to one embodiment.

FIG. 3 is a block diagram of another example battery power management system according to one embodiment. The illustrated system 300 includes similar elements corresponding to the elements illustrated in FIG. 2, and the similar elements in the system 300 can be implemented in accordance with any of the principles and advantages discussed with reference to FIG. 2. The low voltage battery circuit 117 in the system 300 includes the shunt resistor 204, the current amplifier 202, the ADC 212, and the battery control unit 216. The illustrated low voltage battery circuit 117 in FIG. 3 also includes a buffer 302, a comparator 304, a voltage reference provider 310, resistors 312, 314 providing a voltage input to the buffer 302, and resistors 306, 308 implementing a voltage divider providing a threshold voltage, Vth (FIG. 2), to the comparator 304. As illustrated in FIG. 3, the buffer 302 and the comparator 304 can be implemented with amplifiers, such as operational amplifiers. It is to be noted that the illustrate embodiment in FIG. 3 is only one example embodiment, and in other embodiments, the circuit 117 may include additional passive and/or active circuit elements, such as filters, isolation capacitors, buffers, amplifiers, signal processing elements, etc.

In the illustrated example in FIG. 3, the resistors 312, 314, 306, 308 and the comparator 304 can form a battery output current sensing circuit, with the resistors 306, 308 and the comparator 304 coupled to a low current linear regular that allows persistent yet very low level of powering. In some implementations, when the electric vehicle, including the illustrated system 300, powers down, the voltage reference provider 310 can be configured to provide 0 V at the node between the resistors 312 and 314 without affecting the comparator 304. In some embodiments, when the electric vehicle is powered down and the battery control unit 216 is not awake, only the battery output current sensing circuit (306, 308, and 304) can remain powered, allowing only minimal level of power consumption. When a current gets drawn from the low voltage battery 115, the current amplifier 202 starts generating current output to the resistors 312, 314 raising the voltage level at one of the input nodes of the comparator 304. If the raised voltage level by the current output of the current amplifier 202 rises above the threshold voltage level set and provided by the resistors 306, 308, the comparator 304 outputs a wake-up signal to the battery control unit 216.

In some embodiments, the resistors 312, 314 can be implemented to adjust the voltage level to be provided to the comparator 304 and to the buffer 302, if enabled, for further processing (e.g., analog-to-digital conversion with the ADC 212). For example, in certain implementations, the resistor values of the resistors 312, 314 can be selected to provide a reference voltage, such as 1.25 V, to the buffer 302. In such an example, the resistor values of about 1-2 kΩ can be selected for the resistors 312, 314 where the voltage provider is powered at 5 V, and the buffer 302 powered at 3.3 V. The voltage divider implemented with the resistors 306, 308 can provide the threshold voltage, Vth (FIG. 2), to the comparator 304, and the resistance values of the resistors 306, 308 can be selected based, for example, on the desired level of current draw from the low voltage battery 115 that would trigger the battery control unit 304 to wake up, how the desired level of current draw from the low voltage battery 115 affects the output of the current amplifier 202, the resistance values of the resistors 312, 314 that would generate the voltage input to the comparator 304, and the voltage level of the power source coupled to the resistors 306, 308. For example, in some embodiments, the resistors 306, 308 can be coupled to a voltage source providing 3.3 V, and the value of the resistor 306 can be selected to be at around 90-100 KΩ while the value of the resistor 308 can be selected to be around 2-3 KΩ. The implementation of the battery output current sensing circuit with the comparator 304 and a threshold voltage advantageously allows selecting at what level of current draw from the low voltage battery 115 should the battery control unit 216 be woken up and also disallows insubstantial level of leakage currents from triggering the battery control unit 216 to be woken up.

The buffer 302 is configured to receive the enable signal, enable, from the battery control unit 216, which allows the buffer 302 to remain off or disabled when the battery control unit 216 is not awake and has not sent the enable signal. When the battery control unit 216 receives the wake-up signal from the comparator 304, the battery control unit may send the enable signal, enable, to the voltage reference provider 310 and the buffer 302 to enable them. When enabled, the voltage reference provider 310 can raise the voltage level at the node between the resistors 312, 314, to for example 1.25V, or any other suitable level to allow further processing of the input to the buffer 302, such as analog-to-digital conversion at the ADC 212. After the voltage reference provider 310 and the buffer 302 are enabled, a voltage level indicative of the current output, which in turn, is indicative of the current drawn from the low voltage battery 115, from the current amplifier 202 is buffered at the buffer 302 and forwarded to the ADC 212. The digital current measurement output from the ADC 212 is provided to the battery control unit 216 so that the battery control unit 216 can monitor the power drawn from the low voltage battery 115 and control the secondary control unit(s) 222 through the ECU ctrl signal(s) as discussed above in connection with FIG. 2.

Figure 4:
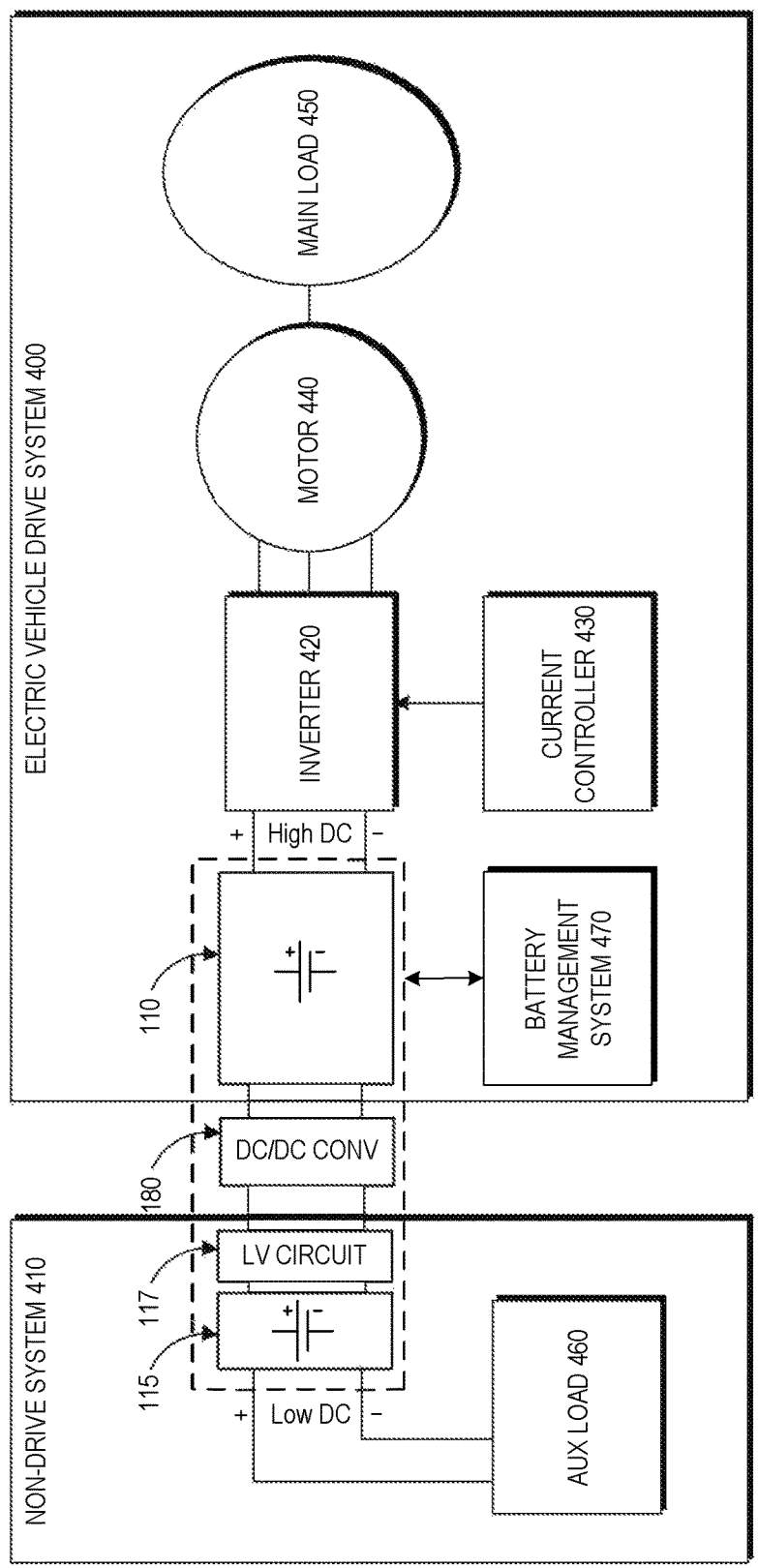
FIG. 4 is an example application of battery power management disclosed herein in an electric vehicle.

FIG. 4 is an example application of battery power management disclosed herein in an electric vehicle. The illustrated example in FIG. 4 includes an electric vehicle drive system 400 and a non-drive system 410. The electric vehicle drive system 400 includes the high voltage battery 110, an inverter 420 coupled to the high voltage battery 110, a current controller 430, a motor 440, and main load 450, and the battery management system 470. The non-drive system 410 includes the low voltage battery 115, the low voltage battery circuit 117, and an auxiliary or secondary load 460, which is powered by the low voltage battery 115. The auxiliary or secondary load 460 illustrated in FIG. 4 can be understood as the low voltage load 190 illustrated in FIG. 1 or the collection of the low voltage systems 220 illustrated in FIGS. 2-3. The high voltage battery 110 of the electric vehicle drive system 400 and the low voltage battery 115 of the non-drive system 410 are coupled to the DC/DC converter 180. In some embodiments, the high voltage battery 110 can be a rechargeable electric vehicle battery or traction battery used to power the propulsion of an electric vehicle including the drive system 400.

The inverter 420 includes power inputs which are connected to conductors of the high voltage battery 110 to receive, for example, DC power, single-phase electrical current, or multi-phase electrical current. Additionally, the inverter 420 can include an input which is coupled to an output of the current controller 430. The inverter 420 can also include three outputs representing three phases with currents that can be separated by 120 electrical degrees, with each phase provided on a conductor coupled to the motor 440. It should be noted that in other embodiments the inverter 420 may produce greater or fewer than three phases.

The motor 440 is fed from voltage source inverter 420 controlled by the current controller 430. The inputs of the motor 440 can be coupled to respective windings distributed about a stator. The motor 440 can be coupled to a mechanical output, for example a mechanical coupling between the motor 440 and main mechanical load 450. The main mechanical load 450 may represent one or more wheels of the electric vehicle.

The current controller 430 can be used to generate gate signals for the inverter 420. Accordingly, control of vehicle speed is performed by regulating the voltage or the flow of current from the inverter 420 through the stator of the motor 440. There are many control schemes that can be used in the electric vehicle drive system 400 including current control, voltage control, and direct torque control. Selection of the characteristics of inverter 420 and selection of the control technique of the controller 430 can determine efficacy of the drive system 400.

The battery management system 470 can receive data from the high voltage battery 110 and/or the low voltage battery 115 and generate control signals to manage one or more of the batteries 110, 115, such as reconfiguration control signals. In some embodiments, the battery management system 470 can also include one or more components for communicating and sending and receiving data within the battery management system 470 and/or with other components or circuitries in the electric vehicle. For example, the various components and circuits within the drive system 400, including components in the battery management system 470 can be in communication with one another using protocols or interfaces such as a controller area network (CAN) bus, serial peripheral interface (SPI), or other suitable protocols or interfaces. And in some embodiments, the processing of incoming data can be at least in part performed by other components not in the battery management system 470 within the electric vehicle as the battery management system 470 communicates with other components. Although illustrated separately in FIG. 4, the low voltage battery circuit 117 can be in part or in whole incorporated into the battery management system 470 in some embodiments.

The low voltage auxiliary load 460 in an electric vehicle application can be certain electronic loads that often require much less power than the main mechanical load 450. Example auxiliary load 460 in an electric vehicle can include the entertainment system, lighting system, door and window lock system, and other similar digital or analog circuits or electronics-based systems. An example voltage level provided to the auxiliary load 460 in an electric vehicle can be 12 V, which can further be converted to various different voltage levels, such as 3 V, 3.3 V, 5 V, etc., as needed by various sub-parts or systems within the auxiliary load 460.

Although not illustrated, the electric vehicle drive system 400 can include one or more position sensors for determining position of the rotor of the motor 440 and providing this information to the current controller 430. For example, the motor 440 can include a signal output that can transmit a position of a rotor assembly of the motor 440 with respect to the stator assembly of the motor 440. The position sensor can be, for example, a Hall-effect sensor, a magnetoresistive sensor, potentiometer, linear variable differential transformer, optical encoder, or position resolver. In other embodiments, the saliency exhibited by the motor 440 can also allow for sensorless control applications. Although not illustrated, the electric vehicle drive system 400 can include one or more current sensors for determining phase currents of the stator windings and providing this information to the current controller 430. The current sensor can be, for example, a Hall-effect current sensor, a sense resistor connected to an amplifier, or a current clamp.

It should be appreciated that while the motor 440 is described as an electrical machine that can receive electrical power to produce mechanical power, it can also be used such that it receives mechanical power and thereby converts that to electrical power. In such a configuration, the inverter 420 can be utilized to excite the winding using a proper control and thereafter extract electrical power from the motor 440 while the motor 440 is receiving mechanical power.

Figure 5:
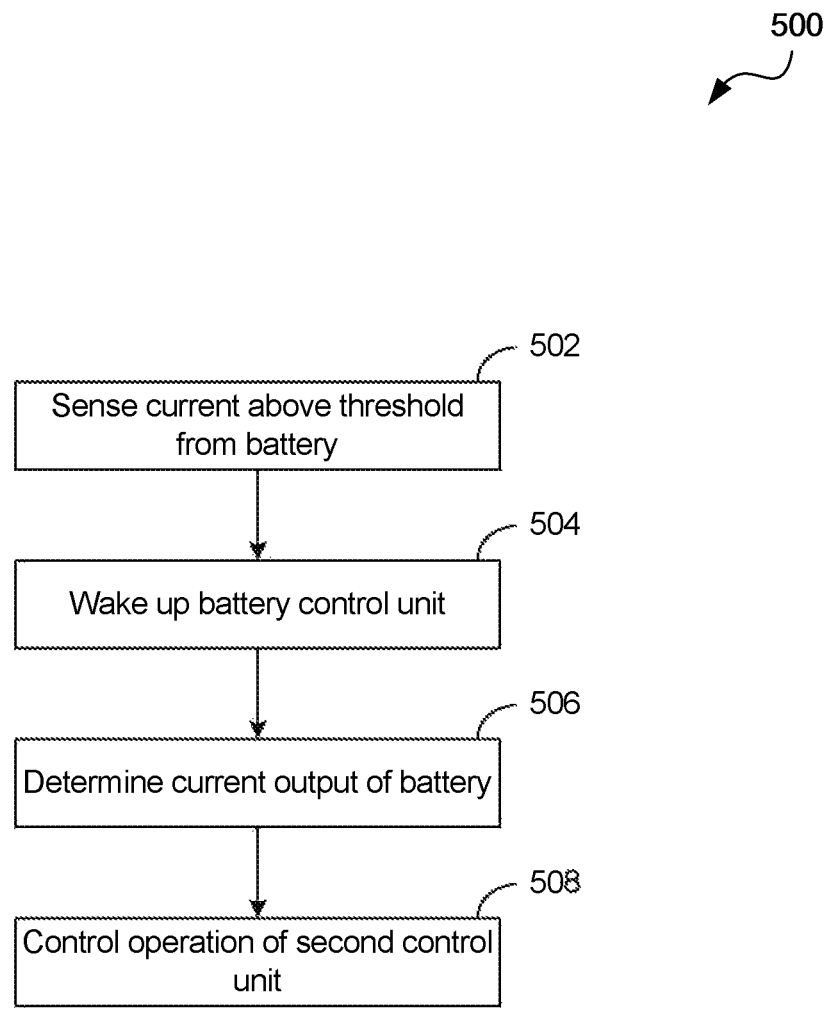
FIG. 5 is a flowchart of an example battery power management process according to one embodiment.

FIG. 5 is a flowchart of an example battery power management process according to one embodiment. The illustrated process 500 can be performed in part by and/or in conjunction with one or more components in the low voltage battery circuit 117 (FIGS. 1-4). It is to be noted that all or parts of steps 502, 504, 506, and 508 may be concurrently, continuously, periodically, intermittently, repeatedly, or iteratively performed, and the illustrated process 500 in FIG. 5 is only one example embodiment of inventive features disclosed herein.

In step 502, a current drawn from the low voltage battery being above a threshold is sensed. In some embodiments the battery output current sensing circuit (e.g., at least parts of 202, 206, and 214 in FIG. 2, or at least parts of 202, 312, 314, 306, and 304 in FIG. 3) can perform the sensing of an output current that is above a certain threshold level as described in connection with FIGS. 2-3 above. When a current level above a threshold is sensed, the process 500 proceeds to step 504.

In step 504, a battery controller, such as the battery control unit 216 (FIGS. 2-3) can be woken up. In some embodiments, an element responsible for sensing above-threshold current level, such as the comparator 214 (FIG. 2) or 304 (FIG. 3), can send a signal to the battery control unit 216 to wake up the battery control unit 216 and allow the battery control unit 216 to enable certain additional parts of the low voltage battery circuit 117 through an enable signal (e.g., enable in FIGS. 2-3) as discussed above in connection with FIGS. 2-3. When the battery control unit 216 is awake and the additional parts of the low voltage battery circuit 117 are enabled, the process 500 continues to step 506.

In step 506, with current measuring circuitry enabled, the current output from the low voltage battery 115 (FIGS. 2-4) can be determined. In some embodiments, the voltage level indicative of the current output from the low voltage battery 115 can be provided to the buffer 210 (FIG. 2) or 302 (FIG. 3), and the buffer 210, 302 can buffer and forward the voltage level to the ADC 212 (FIGS. 2-3) for digitization as discussed in connection with FIGS. 2-3. Also in such embodiments, the battery control unit 216 can receive the output from the ADC 212 indicative of the current output level of the low voltage battery 115, and the battery control unit 216 determines the current output from the low voltage battery 115 for further processing and/or execution of functions accordingly. When the current output of the low voltage battery 115 is determined, the process 500 continues to step 508.

In step 508, one or more control units, such as the secondary control units 222 (FIGS. 2-3), are enabled and/or disabled based on the determined current output level from the low voltage battery 115. In some embodiments, the battery control unit 216 is in communication with the secondary control units 222 as discussed in connection with FIG. 203 above, and once the current output level from the low voltage battery 115 is determined, the battery control unit 216 can proceed to monitor the low voltage battery current output and send control signals to the one or more secondary control units 222 to manage the power level of the low voltage battery 115.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An electric vehicle comprising:
a first battery;
a second battery;
a vehicle drive system powered by the first battery;
a battery control unit for the second battery;
a plurality of secondary systems powered by the second battery, each of the plurality of secondary systems comprising a respective system control unit configured to:
receive a respective control signal from the battery control unit, and
control a current draw by the corresponding secondary system based on receipt of the respective control signal; and
a battery output current sensing circuit coupled to the second battery and the battery control unit, the battery output current sensing circuit configured to:
sense a current level drawn from the second battery is above a threshold level, and
generate a wake-up signal in response to sensing the current level drawn from the second battery is above the threshold level,
wherein the battery control unit is further configured to:
wake up in response to receipt of the wake-up signal,
initiate monitoring of the second battery, and
output one or more of the respective control signals to the respective system control unit to enable or disable the current draw by the respective secondary system based on the monitoring of the second battery.

2. The electric vehicle of claim 1, wherein the battery output current sensing circuit comprises a current amplifier, a comparator, and one or more passive circuit elements.

3. The electric vehicle of claim 2, wherein the current amplifier is configured to measure a voltage across a shunt coupled to the second battery and generate an output.

4. The electric vehicle of claim 1, wherein the monitoring of the second battery is performed by a current measurement processing circuit comprising a voltage reference provider, a buffer, and an analog-to-digital converter (ADC).

5. The electric vehicle of claim 1, wherein the battery output current sensing circuit is in part powered through a low current linear regulator.

6. The electric vehicle of claim 1,
wherein the battery output current sensing circuit is configured to
compare a voltage level indicative of the current level from the second battery to a threshold voltage.

7. The electric vehicle of claim 1, wherein the vehicle drive system comprises a high voltage load coupled to a motor of the electric vehicle, and wherein each of the plurality of secondary systems comprises a low voltage load.

8. The electric vehicle of claim 1, wherein the battery control unit and the plurality of system control units are in communication with one another through a controlled area network (CAN) bus.

9. The electric vehicle of claim 1, wherein the first battery provides a voltage greater than 300 V to the vehicle drive system, and wherein the second battery provides a voltage less than 30 V to the plurality of secondary systems.

10. A method for managing a battery level of an electric vehicle while powered down, the electric vehicle comprising a battery powering a plurality of vehicle systems, each of the plurality of vehicle systems comprising a respective system control unit, the method comprising:
sensing a current level draw from the battery being above a threshold level;
generating a wake-up signal in response to sensing the current level drawn from the battery is above the threshold level;
waking up a battery control unit coupled to the battery in response to receipt of the wake-up signal by the battery control unit;
determining a current output of the battery with the battery control unit upon waking up; and
controlling operation of one or more of the system control units based on the determined current output of the battery, wherein controlling operation comprises outputting, from the battery control unit, one or more control signals to the one or more system control units of the plurality of vehicle systems.

11. The method of claim 10, wherein the battery provides a voltage less than 30 V to the secondary vehicle system.

12. The method of claim 10, wherein the sensing the current level draw above the threshold level comprises comparing a voltage level indicative of the current from the battery to a threshold voltage.

13. The method of claim 10, wherein the determining the current output of the battery comprises enabling a current measurement processing in response to the wake-up signal.

14. The method of claim 13, wherein the current measurement processing comprises:
receiving a voltage level indicative of the current output of the battery;
digitizing the voltage level; and
sending the digitized voltage level to the battery control unit.

15. An electric vehicle low voltage battery monitoring system for an electric vehicle comprising a battery powering a plurality of vehicle systems, each of the plurality of vehicle systems comprising a respective system control unit, the system comprising:
means for sensing a current level draw from the battery being above a threshold level;
means for generating a wake-up signal in response to sending the current level drawn from the battery is above the threshold level;

means for waking up a battery control unit coupled to the battery in response to receipt of the wake-up signal by the battery control unit;
means for determining a current output of the battery upon waking up;
means for controlling operation of one or more of the system control units based on the determined current output of the battery, wherein the means for controlling operation is configured to output one or more control signals to the one or more system control units of the plurality of vehicle system.

* * * * *